United States Patent [19]
Schütte et al.

[11] Patent Number: 6,113,805
[45] Date of Patent: Sep. 5, 2000

[54] COATED SODIUM PERCARBONATE PARTICLES, PROCESS FOR THE PRODUCTION THEREOF AND USE THEREOF

[75] Inventors: Rüdiger Schütte, Frankfurt, Germany; Ivan Pelgrims, Kontich, Belgium; Lothar Kaiser, Heusenstamm; Martin Bewersdorf, Gelnhausen, both of Germany

[73] Assignee: Degussa-Hüls Aktiengesellschaft, Hanau, Germany

[21] Appl. No.: 09/065,579

[22] Filed: Apr. 24, 1998

[30] Foreign Application Priority Data

Apr. 26, 1997 [DE] Germany ............... 197 17 729

[51] Int. Cl.$^7$ ............... C11D 3/395; C11D 7/38
[52] U.S. Cl. ............... 252/186.2; 252/186.25; 252/186.29; 510/375; 510/509
[58] Field of Search ............... 252/186.2, 186.25, 252/186.29; 510/375, 509

[56] References Cited

U.S. PATENT DOCUMENTS

| | | | |
|---|---|---|---|
| 4,325,933 | 4/1982 | Matsumoto et al. | 423/415 |
| 4,657,784 | 4/1987 | Olson | 427/213 |
| 5,340,496 | 8/1994 | Sato et al. | 510/375 |
| 5,462,804 | 10/1995 | Kokubu et al. | 428/402.24 |
| 5,632,965 | 5/1997 | Klasen et al. | 423/274 |
| 5,792,738 | 8/1998 | Baillely | 510/375 |

FOREIGN PATENT DOCUMENTS

| | | |
|---|---|---|
| 0623553A1 | 11/1994 | European Pat. Off. . |
| 0654440A1 | 5/1995 | European Pat. Off. . |
| 2417572 | 11/1974 | Germany . |
| 2622610C2 | 9/1976 | Germany . |
| 2800760C2 | 7/1979 | Germany . |
| 4315380A1 | 11/1994 | Germany . |
| 4329205A1 | 3/1995 | Germany . |
| 4324104 | 3/1997 | Germany . |
| 19544293A | 6/1997 | Germany . |
| 174891 | 1/1922 | United Kingdom . |
| 95/02555 | 1/1995 | WIPO . |
| 95/15291 | 6/1995 | WIPO . |
| 95/15292 | 6/1995 | WIPO . |
| 97/19890 | 6/1997 | WIPO . |

*Primary Examiner*—Jill Warden
*Assistant Examiner*—LaToya Cross
*Attorney, Agent, or Firm*—Smith, Gambrell & Russell, LLP

[57] ABSTRACT

Sodium percarbonate particles stabilized against loss of active oxygen in detergents, bleaches and cleaning agents by the application of a two-layer coating applied by means of a fluidized bed spray process, the inner layer including sodium percarbonate and the outer layer including sodium sulphate.

5 Claims, No Drawings

COATED SODIUM PERCARBONATE PARTICLES, PROCESS FOR THE PRODUCTION THEREOF AND USE THEREOF

INTRODUCTION AND BACKGROUND

The present invention relates to coated sodium percarbonate particles consisting of a core of sodium percarbonate produced in the aqueous phase by crystallization and a firmly adhering, two-layer coating surrounding the core. The sodium percarbonate particles coated according to the invention by means of a fluidized bed spray process are distinguished by high active oxygen stability in detergents and also by high abrasion resistance and good silo storage properties. The invention further relates to the use of the coated sodium percarbonate particles in detergents, cleaning agents and bleaches.

Sodium percarbonate (2 $Na_2CO_3 \cdot 3\ H_2O_2$), which is obtainable both by crystallization in the aqueous phase—see for example DE-PS 28 00 760—and by fluidized bed spray processes—see for example DE-A 43 29 205 —, is used as an active oxygen component in detergents, bleaches and cleaning agents. Owing to the inadequate storage stability of sodium percarbonate in a warm, damp environment and also in the presence of various detergent and cleaning agent components, sodium percarbonate has to be stabilized against loss of active oxygen (Oa). One essential stabilizing technique consists of surrounding the sodium percarbonate particles with a coating consisting of components having a stabilizing action.

It is known from EP-A 0 654 440 to increase the abrasion resistance and, at the same time, the storage stability of sodium percarbonate produced by crystallization by coating it with sodium percarbonate in a fluidized bed. Coating takes place by spraying the sodium percarbonate particles with an aqueous solution substantially containing sodium percarbonate or, at the same time with an aqueous solution substantially containing soda and one substantially containing hydrogen peroxide, wherein soda (sodium carbonate) and $H_2O_2$ substantially being used in a molar ratio of 2 to 3, in a fluidized bed, maintaining a fluidized bed temperature in the range of 40 to 95° C., with water being evaporated. Although the substance data of the sodium percarbonate coated with sodium percarbonate in a fluidized bed, having a core consisting of crystallized sodium percarbonate, are much improved compared with pure crystals, a further increase in active oxygen stability in detergents and cleaning agents would be of interest.

Various processes for increasing stability by coating are known:

GP Patent 174 891 teaches the stabilizing of peroxygen compounds by coating with water glass. However, it is not possible to achieve adequate stabilizing for sodium percarbonate by this method. In addition, the suitability for storing in silos in considerably increased by coating with coating substances containing water glass (because of the reduced caking tendency). With reference to the coating of soda containing water of crystallization, this document also mentions Glauber salt, i.e. sodium sulphate decahydrate, as a possible coating component. However, the coating of sodium percarbonate with a layer of sodium sulphate is not suggested by this document.

In DE-OS 24 17 572 a sodium percarbonate coated in a fluidized bed is disclosed, the coating substance being a mixed compound formed by crystallization of sodium carbonate or bicarbonate with sodium sulphate. According to DE Patent 26 22 610, the single-layer coating contains a sodium silicate in addition to sodium sulphate and sodium carbonate. Despite improved stability of the sodium percarbonate particles coated in this way, the active oxygen content still decreases too strongly during prolonged storage in the presence of a detergent powder. In addition it was found that coated sodium percarbonate particles with soda in the outermost layer display unsatisfactory silo storage behavior, and thus poor flow properties, after prolonged storage.

According to DE-OS 43 15 380, the coating material of a coated sodium percarbonate, the core of which is a sodium percarbonate crystal, consists of a mineral salt mixture substantially of alkali metal sulphate and alkali metal chloride. No suggestion of using sodium sulphate as the sole coating material can be taken from the is document.

A coating according to U.S. Pat. No. 4,325,933, containing exclusively magnesium salts, such as magnesium sulphate, no longer meets current active oxygen stability requirements. Accordingly, WO 95/02555 and EP-A 0 623 553 relate to coated sodium percarbonate particles, the coating of which, in addition to magnesium sulphate and a silicate, also contains soda or an alkali metal slat from the series of carbonates, bicarbonates and sulphates. The single- or multi-layer coating does lead to very good active oxygen stability but the need to use three different coating components is a disadvantage.

WO 95/15291 teaches a process for the production of sodium percarbonate particles with improved stability wherein sodium percarbonate is brought into contact with a $CO_2$-rich gas and moisture in a fluidized bed in order to form a continuous sodium bicarbonate layer on the sodium percarbonate particles. A layer of sodium sulphate may additionally be applied on to the sodium bicarbonate layer.

An object of the present invention is to provide other coated sodium percarbonate particles which display very good active oxygen stability in detergents, bleaches and cleaning agents and good silo storage behavior. Furthermore, the required combination of substance properties should be obtainable with a coating which reduces the active oxygen content to the last possible extent.

SUMMARY OF THE INVENTION

The above and other objects of the invention are achieved by coated sodium percarbonate particles consisting essentially of a core of sodium percarbonate produced in the aqueous phase by crystallization and a firmly adhering, two-layer coating surrounding this core, applied by a fluidized bed spray process, the inner layer consisting essentially of sodium percarbonate and the outer layer consisting essentially of sodium sulphate, which may be partially hydrated.

DETAILED DESCRIPTION OF INVENTION

In accordance with the more detailed aspects of the invention, the core of the sodium percarbonate particles coated with two layers consists essentially of sodium percarbonate crystals. The term "consisting essentially of" means that the core to be coated may contain, to a small extend, auxiliary substances as a result of its production, i.e. its crystallization in the aqueous phase. The auxiliary substances are usually contained in a quantity of less than 10 wt. %, usually less than 5 wt. %, based on the core. The auxiliary substances are especially active oxygen stabilizers such as, for example, silicates and/or magnesium compounds, boron compounds and complexing agents.

The core to be coated according to the invention, consisting essentially of sodium percarbonate, may be produced by a conventional crystallization process, for example that of DE-PS 28 00 760, cited hereinafter and which is relied on and incorporated herein by reference. This comprises the reaction of hydrogen peroxide with the sodium carbonate in a molar ratio of about 2 to 3 in the aqueous phase and crystallization in the presence of conventional crystallization auxiliaries.

The first layer, which, like the core, consists essentially of sodium percarbonate, is applied on to the core by fluidized bed spray granulation as described in EP-A 0 654 440 which is relied on and incorporated herein by reference. The fissured surface of the core becomes more even as a result of the first layer and is thus partially withdrawn from decomposing attack. The term "consisting essentially of" means that conventional active oxygen stabilizers may be present in an effective concentration, generally less than 5 wt. % in total, based on the sodium percarbonate coating, as these stabilizers are introduced with the solutions to be sprayed.

According to the invention, the outer layer of the coating consists essentially of sodium sulphate, which may be partially hydrated. This layer is applied in a fluidized bed on to the sodium percarbonate core coated with sodium percarbonate in a fluidized bed, using an aqueous solution consisting essentially of sodium sulphate.

It is known that sodium sulphate forms various hydrates, for example the decahydrate, which may be contained in the coating layer. In order to be able to develop a good stabilizing action, the attempt is made during production to obtain a product with the lowest possible degree of hydration. For this reason, the fluidized bed temperature is kept above the transition temperature of the decahydrate (32.4° C.) when the outermost coating layer is applied.

DE Patent Application 195 44 293.8, (attorney docket 06-52692) which has not yet been published, and which counterpart U.S. application 08/755,613 is incorporated herein by reference also describes sodium percarbonate particles coated with sodium sulphate as the outermost layer, having a core of sodium percarbonate crystals, but preferably sodium percarbonate fluidized bed granules. However, it is not disclosed to coat sodium percarbonate crystals first with sodium percarbonate and then with sodium sulphate in a fluidized bed.

The proportion by weight of the first coating layer, the sodium percarbonate layer, may be between 1 and 100 wt. %, preferably between 5 and 50 wt. % and especially between 10 and 30 wt. %, based on the particles coated with two layers in each case.

The proportion by weight of the second layer, the layer substantially consisting of sodium sulphate, is generally between 0.5 and 25 wt. %, calculated as hydrate-free, based on the sodium percarbonate coated with two layers. The coating quantity preferably amounts to 1 to 15 wt. %, especially 2 to 10 wt. %, calculated as hydrate-free in each case and based on the sodium percarbonate coated with two layers.

Sodium percarbonate particles coated with two layers according to the invention may be produced in that (i) an aqueous solution substantially of sodium percarbonate or, at the same time, an aqueous solution substantially of soda and an aqueous solution substantially of hydrogen peroxide, in a molar ratio substantially of 2 to 3, is sprayed on to uncoated particles, located in a fluidized bed, consisting of sodium percarbonate obtained in the aqueous phase by crystallization, maintaining a fluidized bed temperature of 35 to 100° C. and with simultaneous evaporation of water, and (ii) an aqueous solution consisting essentially of sodium sulphate is sprayed on to the particles coated with one layer which are obtained, maintaining a fluidized bed temperature of 35 to 100° C. and with simultaneous evaporation of water.

The process for applying a coating on to sodium percarbonate by spraying aqueous solutions containing coating components on to coated or uncoated sodium percarbonate particles located in a fluidized bed is known; (EP-A 0 623 553, WO 95/02555, DE-PS 26 22 610 and EP-A 0 654 440). In these documents, however, the sole use of sodium sulphate as the single stabilizing component of a coating layer on sodium percarbonate obtained by crystallization, which has been coated with sodium percarbonate in a fluidized bed, is not disclosed or suggested. The required drying air is usefully provided by flue gas.

The sodium percarbonate coating layer is applied in accordance with EP-A 0 654 440. To produce the outer layer, an $Na_2SO_4$ solution with a content of between 10 and 30 wt. % sodium sulphate is preferably used as the $Na_2SO_4$ spraying solution. This solution is sprayed on to the particles in the fluidized bed by means of one or more spray nozzles. Spraying preferably takes place at a fluidized bed temperature of 50 to 80° C. The gas used for fluidizing and drying during both stages, usually air generally has a temperature of between 50 and 200° C., especially 80 to 120° C.

The inner and outer coating layers may be applied in conventional apparatus for fluidized bed spray granulation, for example in substantially round fluidized bed apparatus or in a fluidized channel. During or after application of the outermost coating layer, the material located in the fluidized bed or removed therefrom may be subjected to a conventional sorting process.

As can be seen from the example and the comparative example, the combination of the coating layers applied in the fluidized bed has a positive effect on the active oxygen stability and the suitability for string in silos. In the context of the development of sodium percarbonate with good active oxygen stability it was considered necessary, since sodium sulphate as the sole coating component on sodium percarbonate crystals led to an inadequate increase in the active oxygen stability, to use sodium sulphate in the form of mixed salts or as a component of a multi-component composition. It was surprising, therefore, that, as a result of the construction of the sodium percarbonate particles according to the invention, with the outermost coating layer consisting essentially of sodium sulphate, both very good active oxygen stability and, in addition, excellent suitability of storing in silos are achieved. As a result of the high suitability of sodium percarbonate particles according to the invention for storing in silos, no agglomeration occurs and thus there are no discharge difficulties and no bridging in silos, and no handling and metering problems in large and small drums.

The sodium percarbonate particles coated according to the invention may be used as bleaching component in detergents, cleaning agents, bleaches and disinfectants. The cleaning agents mentioned also include dishwashing agents and denture cleaners in addition to conventional polishing and scouring agents. These detergent, cleaning agent, bleach and disinfectant compositions are distinguished by the fact that the coated sodium percarbonate contained therein has an unexpectedly high storage stability in the presence of conventional components, such as zeolites in particular, so that only very slow loss of active oxygen occurs during the conventional storage of these compositions. The detergents, cleaning agents, bleaches and disinfectants in question consist of 1 to 99 wt. % of sodium percarbonate particles coated according to the invention or a mixture of these and other active oxygen bleaching agents, and of other conventional components of these agents making up the remainder of the quantity to 100 wt. %. These components include in particular:

1. Surfactants from the series of cationic, anionic, non-ionic, amphoteric or ampholytic surfactants.

2. Inorganic and/or organic builders, the main action of which consists in sequestering or complexing the metal ions responsible for the hardness of water, for example zeolites, laminar silicates, polyphosphates, aminopolyacetic acids and aminopolyphosphonic acids, as well as polyoxycarboxylic acids.

3. Components acting as alkalis, such as alkanolamines, and inorganic electrolytes, such as silicates, carbonates and sulphates.

4. Bleach activators from the series of N-acyl compounds and O-acyl compounds, such as tetraacetylethylenediamine (TAED) and nonanoyloxybenzenesulphonate (NOBS).

5. Other components of the agents may be stabilizers for peroxides, such as especially magnesium slats, antiredeposition agents, optical brigtheners, foam inhibitors, enzymes, disinfectants, corrosion inhibitors, perfumes, colors and agents for regulating the pH. Reference is made to DE-OS 33 21 082, pages 14–30, for example, in respect of individual compounds included in substance categories 1 to 5.

EXAMPLES AND COMPARATIVE EXAMPLES a) General specification for applying a sodium sulphate coating to coated or uncoated sodium percarbonate in a fluidized bed:

A fluidized bed of the sodium percarbonate (NaPc) to be coated, which optionally already exhibits one coating layer, is constructed in a fluidized bed dryer using drying air (inlet air temperature 100 to 100° C.). A 20 wt. % aqueous sodium sulphate solution is sprayed on to the particles located in the fluidized bed, the temperature of the fluidized bed being maintained in the range of 50 to 60° C.; subsequent drying is carried out at 80 to 90° C. The solution is sprayed using conventional two-component nozzles with air as propellant.

b) Determination of the storage stability of coated sodium percarbonate particles, made according to the invention and for comparison purposes, in detergent mixtures (=Oa content (%)):

A phosphate-free but zeolite-containing detergent powder, activator TAED and a coated and uncoated sodium percarbonate (NaPc) respectively are mixed in a quantity such that the mixture contains 5% TAED and the Oa content is about 2.35 wt. %. Components in the detergent powder in wt. %:

| | | |
|---|---|---|
| Anionic surfactants | 12 | |
| Non-ionic surfactants | 8 | |
| Zeolite A | 36 | |
| Soda | 10 | |
| Na-silicates | 3 | |
| Remainder incl. moisture | 31. | |

800 g of each mixture are stored in commercial E1 detergent packs, impregnated to be water-repellent and sealed, at 30° C. and 80% relative humidity in a climatic cabinet. One pack is stored for each removal period—after 4 and 8 weeks. The Oa content is determined permanganometrically by conventional means; the relevant Oa content is established as a % from the starting Oa content and the Oa content after 4 and 8 weeks.

Comparative Example 1 (CE 1)

Sodium percarbonate obtained by a crystallization process using an aqueous phase containing common salt and sodium hexametaphosphate with a residual moisture content of 8 wt. % was dried in a channel-shaped fluidized bed dryer. Active oxygen content (Oa):P 13.9%; dissolving time for 2 g/l at 15° C. 1 minute.

Comparative Example 2 (CE 2)

Fluidized bed granules (=FB granules) were produced in accordance with DE-A 43 29 205. Oa content 14.2%.

Comparative Examples 3 (CE 3) and 4 (CE 4)

Sodium percarbonate from comparative example 1 was coated in a fluidized bed with 10 wt. % (=CE 3) and 25 wt. % (=CE 4) sodium percarbonate respectively, based on the core, in a fluidized bed channel comprising a spray zone and a drying zone. The spray solution was a mixture of an aqueous soda solution (30 wt. %) and aqueous hydrogen peroxide solution (70 wt. %), which were sprayed by means of a three-component nozzle with external mixing of the solutions and air as the propellant; the molar ratio of $Na_2CO_3$ to $H_2O_2$ in the two solutions was 2 to 3, the sodium percarbonate content in the mixture 36.9 wt. %. The temperature of the fluidized bed was 55° C. in the spray zone and 65° C. in the drying zone. CE 3: Oa=13.9%; CE 4:Oa=14.0%.

Comparative Examples 5 and 6

Sodium percarbonate crystals according to CE 1 were coated with 10 wt. % sodium sulphate, based on the sodium percarbonate core (=CE 5); sodium percarbonate fluidized bed spray granules according to CE 2 were coated in the same way with 5 wt. % sodium sulphate (=CE 6). CE 6 corresponds to example 1 of the unpublished DE Patent Application 195 44 293.8.

Examples 1 and 2

Sodium percarbonate from comparative examples 3 and 4 was coated with 5 wt. % $Na_2SO_4$ in each case.

The Oa content of the examples and comparative examples may be taken from the table. All the products with $Na_2SO_4$ in the outermost coating show no agglomeration and display high abrasion resistance.

Further modifications and variations will be apparent to those skilled in the art from the foregoing and are intended to be encompassed by the claims appended hereto.

German priority document 197 17 729.8 is relied on and incorporated herein by reference.

TABLE

| No. | NaPc core | outer coating/ wt. % | Oa content (%) | Oa content in detergent after 4 weeks |
|---|---|---|---|---|
| CE 1 | crystals | — | 13.9 | 30 |
| CE 2 | FB granules | — | 14.2 | 52 |
| CE 3 | crystals | NaPc/10 | 13.9 | 35 |
| CE 4 | crystals | NaPc/25 | 14.0 | 50 |
| CE 5 | crystals | $Na_2SO_4$/10 | 12.4 | 70 |

TABLE-continued

| No. | NaPc core | outer coating/ wt. % | Oa content (%) | Oa content in detergent after 4 weeks |
|---|---|---|---|---|
| CE 6 | FB granules (= CE 2) | $Na_2SO_4$/5 | 13.5 | 95 |
| Ex. 1 | CE 3 | $Na_2SO_4$/5 | 13.2 | 75 |
| Ex. 2 | CE 4 | $Na_2SO_4$/5 | 13.3 | 90 |

We claim:

1. A coated sodium percarbonate particle consisting essentially of a core of sodium percarbonate produced in the aqueous phase by crystallization and a firmly adhering, two-layer coating surrounding said core, which two-layer coating is applied by a fluidized bed spray process, wherein the inner layer of said two-layer coating consists essentially of sodium percarbonate and the outer layer of said two-layer coating consists essentially of sodium sulphate, wherein said sodium sulphate layer may be partially hydrated.

2. The coated sodium percarbonate particle according to claim 1, wherein the inner layer consists essentially of 5 to 25 wt. % sodium percarbonate and the outer layer consists essentially of 0.5 to 25 wt. % sodium sulphate, calculated as anhydrous, based on the particles coated with two layers in each case.

3. The coated sodium percarbonate particles according to claim 2, wherein the inner layer consists essentially of 10 to 25 wt. % and the outer layer consists essentially of 2 to 10 wt. %, based on the particles coated with two layers in each case.

4. A process for the production of sodium percarbonate particles coated with two layers according to claim 1 comprising:

a) forming an aqueous solution consisting essentially of sodium percarbonate or alternatively forming an aqueous solution consisting essentially of soda and hydrogen peroxide in a molar ratio of 2 to 3;

b) spraying said aqueous solution onto uncoated particles, wherein the uncoated particles are located in a fluidized bed and consist essentially of sodium percarbonate obtained by crystallization in the aqueous phase;

c) maintaining a fluidized bed temperature of 35–100° C. with simultaneous evaporation of water to thereby obtain sodium percarbonate particles coated with a first layer of sodium percarbonate;

d) spraying an aqueous solution consisting essentially of sodium sulfate onto the first coated particles;

e) maintaining a fluidized bed temperature of 35–100° C. with simultaneous evaporation of water to thereby obtain sodium percarbonate particles coated with a second layer of sodium sulfate.

5. A bleaching component comprising a coated sodium percarbonate particle consisting essentially of a core of sodium percarbonate produced in the aqueous phase by crystallization and a firmly adhering, two layer coating surrounding said core, which two layer coating is applied by a fluidized bed spray process, wherein the inner layer of said two layer coating consists essentially of sodium percarbonate and the outer layer of said two layer coating consists essentially of sodium sulphate, wherein said sodium sulphate layer may be partially hydrated.

* * * * *